(12) United States Patent
Sherwood et al.

(10) Patent No.: US 12,190,196 B1
(45) Date of Patent: Jan. 7, 2025

(54) IMAGE QUALITY WHEN A CAMERA-BASED BARCODE-READING DEVICE IS READING BARCODES LOCATED ON MOVING OBJECTS

(71) Applicant: The Code Corporation, Murray, UT (US)

(72) Inventors: Patrick R. Sherwood, West Jordan, UT (US); Bruce Robert Scharf, Salt Lake City, UT (US)

(73) Assignee: THE CODE CORPORATION, Murray, UT (US)

( * ) Notice: Subject to any disclaimer, the term of this patent is extended or adjusted under 35 U.S.C. 154(b) by 0 days.

(21) Appl. No.: 18/329,288

(22) Filed: Jun. 5, 2023

(51) Int. Cl.
*G06K 7/10* (2006.01)
*G06K 7/14* (2006.01)
*G06T 7/20* (2017.01)

(52) U.S. Cl.
CPC ....... *G06K 7/10722* (2013.01); *G06K 7/1413* (2013.01); *G06T 7/20* (2013.01)

(58) Field of Classification Search
CPC .................... G06K 7/10722; G06K 7/1413
USPC .................................................. 235/462.41
See application file for complete search history.

(56) References Cited

U.S. PATENT DOCUMENTS

| 5,442,167 | A * | 8/1995 | Cornelius | G02B 7/36 |
| | | | | 348/E5.045 |
| 5,770,841 | A * | 6/1998 | Moed | B07C 3/14 |
| | | | | 235/375 |
| 6,705,526 | B1 * | 3/2004 | Zhu | G06K 7/10811 |
| | | | | 235/472.01 |
| 7,433,590 | B2 * | 10/2008 | Freyman | G06K 7/10732 |
| | | | | 396/157 |
| 8,489,232 | B2 * | 7/2013 | Mishra | H04N 7/18 |
| | | | | 235/384 |
| 9,501,683 | B1 * | 11/2016 | Hatstat | G06K 7/1465 |
| 10,179,699 | B1 * | 1/2019 | Roper | G06Q 10/08 |
| 10,848,688 | B1 * | 11/2020 | Lee | H04N 23/50 |
| 10,984,378 | B1 * | 4/2021 | Eckman | G06K 19/06131 |
| 2013/0015244 | A1 * | 1/2013 | Anselment | G06K 7/10712 |
| | | | | 235/440 |
| 2015/0122890 | A1 * | 5/2015 | Olmstead | G06K 7/10603 |
| | | | | 235/462.14 |
| 2016/0104020 | A1 * | 4/2016 | Bachelder | G06K 7/1465 |
| | | | | 235/462.12 |
| 2016/0379351 | A1 * | 12/2016 | Michael | G06T 7/001 |
| | | | | 348/46 |
| 2017/0357937 | A1 * | 12/2017 | Edens | G06K 7/10861 |
| 2018/0040150 | A1 * | 2/2018 | Saporetti | G06T 11/60 |
| 2020/0207116 | A1 * | 7/2020 | Raphael | B41J 11/703 |
| 2022/0218124 | A1 * | 7/2022 | Engholm | A47F 9/04 |

(Continued)

*Primary Examiner* — Allyson N Trail
(74) *Attorney, Agent, or Firm* — Thomas M. Hardman

(57) ABSTRACT

The present disclosure describes techniques for improving image quality when a camera-based barcode-reading device is reading barcodes located on objects that are moving relative to the barcode-reading device. The techniques disclosed herein enable the image sensor in the barcode-reading device's camera to remain aimed at an object that is moving relative to the barcode-reading device while the camera is capturing an image of the object. Advantageously, the techniques disclosed herein can reduce image blur. In a barcode-reading device that includes a rolling shutter-type image sensor, the techniques disclosed herein can also reduce image distortion.

18 Claims, 14 Drawing Sheets

(56) References Cited

U.S. PATENT DOCUMENTS

| | | | |
|---|---|---|---|
| 2023/0099417 A1* | 3/2023 | Drumheller | G06T 7/80 348/187 |
| 2023/0199310 A1* | 6/2023 | Trajkovic | H04N 23/61 348/345 |
| 2023/0331498 A1* | 10/2023 | Hau | B25J 9/0093 |
| 2024/0073531 A1* | 2/2024 | Sun | G06V 20/50 |
| 2024/0116664 A1* | 4/2024 | Najjar | B65C 9/28 |

* cited by examiner

IMAGE QUALITY WHEN A CAMERA-BASED BARCODE-READING DEVICE IS READING BARCODES LOCATED ON MOVING OBJECTS

CROSS-REFERENCE TO RELATED APPLICATIONS

N/A

BACKGROUND & SUMMARY

The present disclosure is generally related to barcodes and barcode-reading devices. The term "barcode" refers to an optical machine-readable representation of information. The term "barcode-reading device" refers to any device that is capable of identifying or extracting information from barcodes. The process of identifying or extracting information from a barcode can be referred to as reading (or scanning) a barcode. When a barcode is successfully read (or scanned) by a barcode-reading device, the information that is identified or extracted from the barcode can be referred to as decoded data.

A camera-based barcode-reading device includes a camera for capturing one or more images of a barcode to be read. Once one (or more) images of a barcode have been captured by the camera, a decoder processes the image(s) and extracts the information contained in the barcode.

A camera-based barcode-reading device can be a dedicated hardware device that is specifically designed for barcode reading. This type of device may be referred to as a dedicated barcode reader (or scanner). Alternatively, a camera-based barcode-reading device can be a general-purpose computing device (e.g., a smartphone, a tablet computer) that includes a camera and that is equipped with software for reading barcodes.

The camera in a camera-based barcode-reading device includes an image sensor, which is an array of light-sensing elements that are arranged in horizontal rows and vertical columns. The light-sensing elements within an image sensor generate electrical signals in response to being exposed to light. To capture an image, the light-sensing elements within an image sensor are exposed to light for a certain period of time (known as the "exposure time"), and the electrical signals are then read from the light-sensing elements.

The light-sensing elements within an image sensor are often referred to as picture elements, or "pixels." The term "pixel" can also refer to the smallest single component of a digital image. In the discussion that follows, the term "image sensor pixel" will be used to refer to a light-sensing element within an image sensor, and the term "image pixel" will be used to refer to the smallest single component of a digital image.

The exposure time of an image sensor is controlled by an electronic shutter. Broadly speaking, there are currently two types of electronic shutters: rolling shutters and global shutters. With a global shutter, the exposure time starts and stops at the same time for all of the image sensor pixels, and the electrical signals from all of the image sensor pixels are read out at the same time. With a rolling shutter, the exposure time of each row (or column) of image sensor pixels immediately precedes that row's (or that column's) readout, in a process that "rolls" across the image frame.

When a camera is capturing an image of an object, any motion of the object during the exposure time can negatively affect image quality. For example, motion of the object during the exposure time can cause the object to appear blurry in the resulting image. This is sometimes referred to as "image blur." If the image sensor is a rolling shutter-type image sensor, motion of the object during the exposure time can also cause the object to be distorted in the image. This is sometimes referred to as "image distortion."

The present disclosure describes techniques for improving image quality when a camera-based barcode-reading device is reading barcodes located on objects that are moving relative to the barcode-reading device. The techniques disclosed herein enable the image sensor in the barcode-reading device's camera to remain aimed at an object that is moving relative to the barcode-reading device while the camera is capturing an image of the object. Advantageously, the techniques disclosed herein can reduce image blur. In a barcode-reading device that includes a rolling shutter-type image sensor, the techniques disclosed herein can also reduce image distortion.

Broadly speaking, methods for keeping the image sensor aimed at an object can be categorized into two groups: open-loop systems and closed-loop systems. Examples of both types of systems are disclosed herein. In an open-loop system, the image sensor is moved based on the assumed position, direction, and speed of the object. In a closed-loop system, images captured by the barcode-reading device's camera are processed to determine the relative velocity of an object in the images (i.e., the velocity of the object relative to the camera), and the position and velocity of the image sensor are adjusted with the objective of minimizing the relative velocity. The relative velocity may alternatively be referred to as the instantaneous error of the system. Stated another way, the relative velocity of an object can be defined as the mismatch between where the image sensor is "looking" and where the object is.

In some embodiments of the invention disclosed herein, a barcode-reading device includes an actuator that is configured to control movement of at least one camera component (e.g., the image sensor, one or more lenses). The barcode-reading device also includes an image processing module. The image processing module is configured to process one or more images captured by the camera to determine the relative velocity of an object in the images. The image processing module is also configured to send control signals to the actuator based on the results of processing the image(s). The control signals cause the actuator to move at least one camera component in order to reduce the relative velocity between the object and the image sensor.

In some embodiments, an actuator controls movement of the barcode-reading device itself (instead of controlling movement of a camera component) in order to reduce the relative velocity between the object and the image sensor.

In some embodiments, a barcode-reading device can be used to read barcodes located on objects that are moving along a moving surface, such as a conveyor belt. An actuator causes the barcode-reading device to move along a pre-defined path. During part of this pre-defined path, the following two conditions are satisfied: (i) the barcode-reading device moves in the same direction and at substantially the same speed as the conveyor belt, and (ii) the barcode-reading device is positioned so that at least part of the conveyor belt is located within the field of view of the camera. Condition (i) may be referred to herein as the velocity condition, and condition (ii) may be referred to herein as the field of view condition. The camera within the barcode-reading device captures image(s) while the velocity condition and the field of view condition are satisfied.

The subject matter in the background and summary section is intended to provide an overview of the overall context for the subject matter disclosed herein. Additional features and advantages will be set forth in the description that follows. Nothing that is described in the background and summary section should be assumed to be prior art merely as a result of its mention in the background and summary section. Similarly, a problem mentioned in the background and summary section should not be assumed to have been previously recognized in the prior art.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1A:
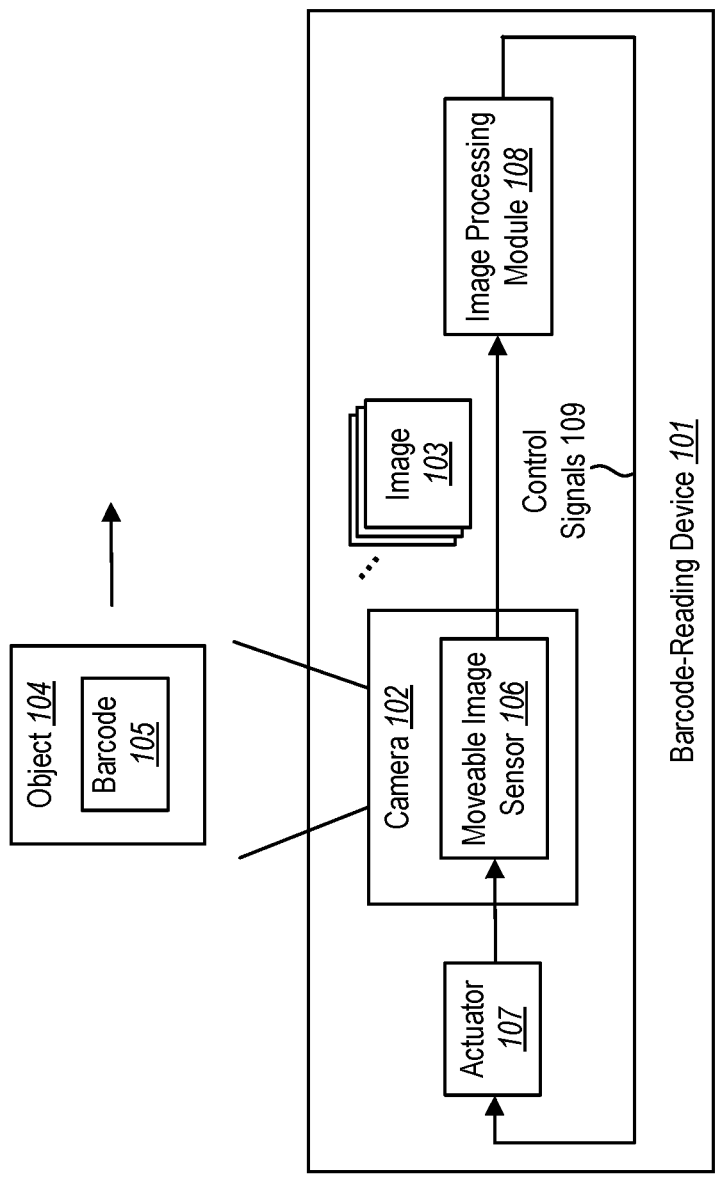
FIG. 1A illustrates a barcode-reading device that is capturing images of a moving object, the barcode-reading device including a moveable image sensor, an image processing module that determines the relative velocity of the object, and an actuator that moves the moveable image sensor in order to reduce the relative velocity between the object and the moveable image sensor.

FIG. 1A illustrates an example of a barcode-reading device 101 that is configured for improving image quality in accordance with the present disclosure. The barcode-reading device 101 is a camera-based barcode-reading device. In other words, the barcode-reading device 101 includes a camera 102, and as part of the process of reading barcodes the camera 102 captures images 103. Once an image 103 of a barcode has been captured by the camera 102, a decoder processes the image 103 and extracts the information contained in the barcode.

FIG. 1A also shows an object 104 that is moving relative to the barcode-reading device 101. A barcode 105 is positioned on the object 104. The barcode-reading device 101 can be used to read the barcode 105 while the object 104 is moving relative to the barcode-reading device 101.

As noted above, when the camera 102 is capturing an image 103 of the object 104, any motion of the object 104 during the exposure time of the image sensor can result in image blur. If the image sensor is a rolling shutter-type image sensor, motion of the object 104 during the exposure time can also result in image distortion. The techniques disclosed herein can improve image quality by enabling the image sensor within the camera 102 to remain aimed at the object 104 while the camera 102 is capturing an image 103 of the object 104, thereby reducing or eliminating image blur and potentially also reducing or eliminating image distortion.

In the depicted example, the image sensor in the camera 102 is a moveable image sensor 106. The barcode-reading device 101 also includes an actuator 107. The actuator 107 is configured to control the movement of the moveable image sensor 106. Some non-limiting examples of actuators 107 that could be used include an array of voice coils, an electromagnetic motor, and a mechanical linkage between the moveable image sensor 106 and the object 104.

The barcode-reading device 101 includes an image processing module 108. The image processing module 108 is configured to process images 103 of the object 104 captured by the camera 102 to determine the relative velocity of the object 104 (i.e., the velocity of the object 104 relative to the camera 102). The image processing module 108 is also configured to send control signals 109 to the actuator 107 based on the results of processing the images 103. The control signals 109 cause the actuator 107 to move the moveable image sensor 106 in order to reduce the relative velocity between the object 104 and the moveable image sensor 106.

In some embodiments, the actuator 107 causes the moveable image sensor 106 to move without moving the entire camera 102. In other words, the actuator 107 causes the moveable image sensor 106 to move but does not cause at least some of the other components within the camera 102 to move.

In some embodiments, determining the relative velocity of the object 104 can include performing calculations with respect to two consecutive images 103. More specifically, the image processing module 108 can be configured to compute the position of the object 104 in two consecutive images 103. From those two positions, the image processing module 108 can determine the relative velocity of the object 104 and send control signals 109 to the actuator 107, which moves the moveable image sensor 106 to reduce this relative velocity to zero (or as close to zero as realistically possible).

Alternatively, in some embodiments, determining the relative velocity of the object 104 can include performing calculations with respect to a single image 103. More specifically, each captured image 103 can be analyzed to quantify direction and magnitude of the image blur apparent on the object 104. The control signals 109 can be designed to cause the actuator 107 to move the moveable image sensor 106 in order to reduce the image blur to zero (or as close to zero as realistically possible).

Figure 1B:
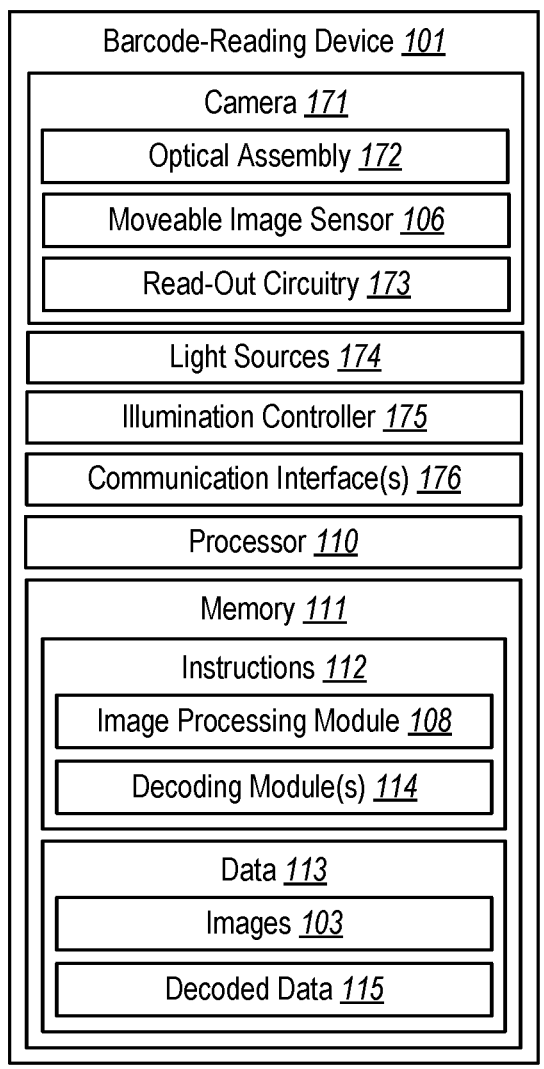
FIG. 1B illustrates additional components that can be included in the barcode-reading device shown in FIG. 1A.

FIG. 1B illustrates additional components that can be included in the barcode-reading device 101.

The barcode-reading device 102 includes a camera 171 that is configured to capture images 103 (which may alternatively be referred to as image frames). The camera 171 includes an optical assembly 172 including one or more lenses. As noted above, the camera 171 includes an image sensor 106, which in the depicted embodiment is a moveable image sensor 106. The image sensor 106 may alternatively be referred to as an imager, a photosensor array, etc. The image sensor 106 can be a solid-state device that is configured to detect and convey information used to make an image 103. The image sensor 106 can include a relatively large number of light-sensitive image sensor pixels that are arranged in horizontal rows and vertical columns. The image sensor 106 can be a charge-coupled display (CCD) image sensor, a complementary metal-oxide-semiconductor (CMOS) image sensor, or another type of image sensor.

The lens(es) within the optical assembly 172 can be configured to receive light reflected from objects within the field of view of the camera 171 and focus this reflected light onto the image sensor 106. The camera 171 can also include read-out circuitry 173 that is configured to electronically read the image sensor pixels within the image sensor 106 to provide an image 103 (i.e., a two-dimensional array of image sensor pixel data).

The barcode-reading device 101 can include a plurality of light sources 174 that can be activated to illuminate a barcode. The barcode-reading device 101 also includes an illumination controller 175 that controls the activation and deactivation of the light sources 174.

The barcode-reading device 101 includes a processor 110 and memory 111 that is communicatively coupled to the processor 110. Instructions 112 and data 113 are stored in the memory 111. The instructions 112 are executable by the processor 110 to implement some or all of the methods, steps, operations, actions, or other functionality that is described herein in connection with the barcode-reading device 101. Executing the instructions 112 can involve the use of the data 113 that is stored in the memory 111.

The data 113 stored in the memory 111 include images 103 captured by the camera 102. At least some of the captured images 103 can include images 103 of barcodes 105 (e.g., images 103 of objects 104 that include barcodes 105).

In addition to the image processing module 108 described previously, the instructions 112 stored in the memory 111 also include one or more decoding modules 114. The decoding module(s) 114 are executable by the processor 110 to implement one or more barcode decoding algorithms. Implementing the barcode decoding algorithm(s) involves processing the images 103 captured by the camera 102 and trying to find and decode barcodes 105 in those images 103. Decoding barcodes 105 in the images 103 generates decoded data 115.

The barcode-reading device 101 includes one or more communication interfaces 176 that facilitate communication between the barcode-reading device 101 and other devices.

Figure 2:
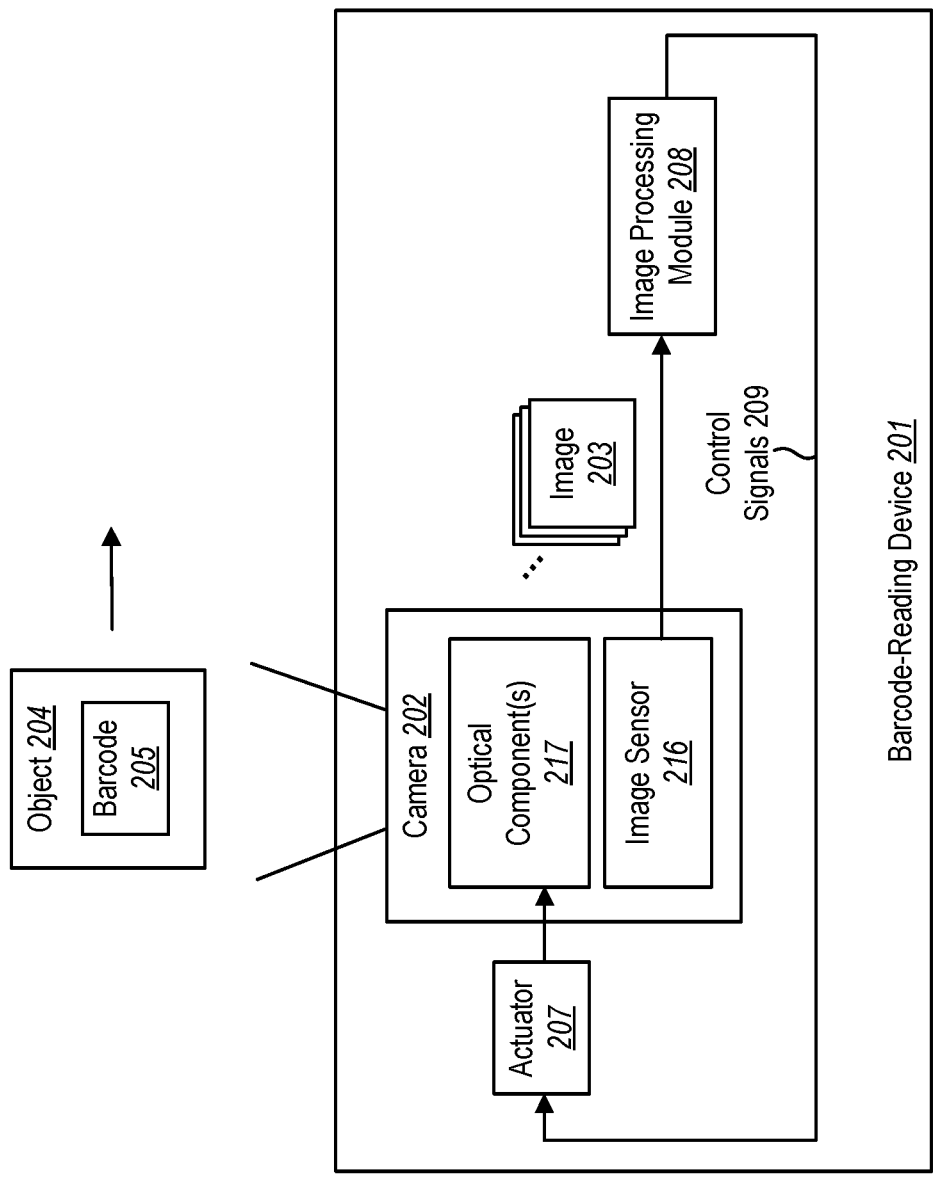
FIG. 2 illustrates a barcode-reading device that is similar to the barcode-reading device shown in FIG. 1A, except that the actuator moves at least one optical component in order to reduce the relative velocity between the object and the image sensor.

FIG. 2 illustrates another example of a barcode-reading device 201 that is configured for improving image quality in accordance with the present disclosure. The barcode-reading device 201 is similar in some respects to the barcode-reading device 101 that was discussed above in connection with FIGS. 1A and 1B. For example, the barcode-reading device 201 includes a camera 202 that is configured to capture images 203. The barcode-reading device 201 also includes an actuator 207 and an image processing module 208. The barcode-reading device 201 can also include the additional components described above in connection with FIG. 1B. FIG. 2 also shows an object 204 that is moving relative to the barcode-reading device 201. A barcode 205 is positioned on the object 204.

In the depicted example, instead of moving the image sensor 216, the actuator 207 moves one or more optical components 217 in order to reduce the relative velocity between the object 204 and the image sensor 216. More specifically, similar to the image processing module 108 in the barcode-reading device 101 discussed previously, the image processing module 208 in the barcode-reading device 201 processes images 203 of the object 204 captured by the camera 202 to determine the relative velocity of the object 204. The image processing module 208 also sends control signals 209 to the actuator 207 based on the results of processing the images 203. However, in contrast to the control signals 109 in the barcode-reading device 101 discussed previously, the control signals 209 in the barcode-reading device 201 cause the actuator 207 to move one or more optical components 217 (instead of moving a moveable image sensor 106) in order to reduce the relative velocity between the object 204 and the image sensor 216. Thus, in the embodiment shown in FIG. 2, the image sensor 216 in the camera 202 is not necessarily a moveable image sensor (although it could be).

In some embodiments, the actuator 207 causes the optical component(s) 217 to move without moving the entire camera 202. In other words, the actuator 207 causes the optical component(s) 217 to move but does not cause the image sensor 216 and/or at least some of the other components within the camera 202 to move.

Some non-limiting examples of actuators 207 that could be used include one or more voice coils and a piezoelectric actuator.

Various types of optical components 217 can be used. In some implementations, the optical component(s) 217 can include a mirror galvanometer (i.e., a high-speed, controllable mirror), and the actuator 207 can be configured to move the mirror galvanometer in order to reduce the relative velocity between the object 204 and the image sensor 216. Alternatively, or in addition, the optical component(s) 217 can include an optical wedge that could be tilted or otherwise moved to reduce the relative velocity between the object 204 and the image sensor 216.

Thus, the actuator 107 in the barcode-reading device 101 shown in FIGS. 1A and 1B and the actuator 207 in the barcode-reading device 201 shown in FIG. 2 are both configured to control movement of at least one camera component in order to reduce the relative velocity between an object and an image sensor. The actuator 107 in the barcode-reading device 101 shown in FIGS. 1A and 1B controls movement of the moveable image sensor 106 in order to reduce the relative velocity between the object 104 and the moveable image sensor 106. The actuator 207 in the barcode-reading device 201 shown in FIG. 2 controls movement of at least one optical component 217 of the camera 202 in order to reduce the relative velocity between the object 204 and the image sensor 216.

In some embodiments, the actuator 207 can include an array of voice coils.

Figure 3:
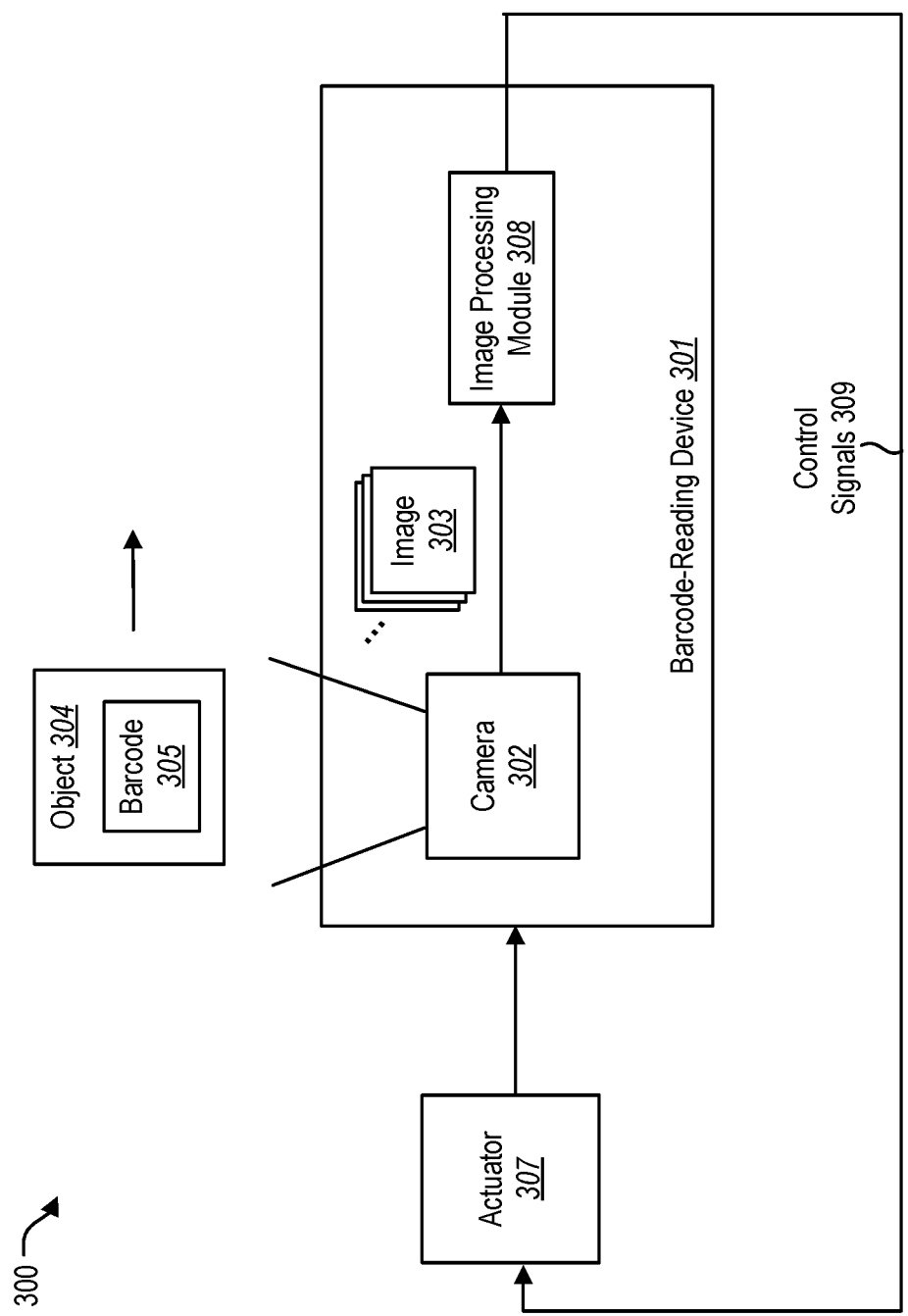
FIG. 3 illustrates another barcode-reading device that is similar to the barcode-reading device shown in FIG. 1A, except that the actuator moves the barcode-reading device itself in order to reduce the relative velocity between the object and the image sensor.

FIG. 3 illustrates an example of a system 300 that is configured for improving image quality in accordance with the present disclosure. The system 300 includes a barcode-reading device 301 that is similar in some respects to the barcode-reading devices 101, 201 described previously. For example, the barcode-reading device 301 includes a camera 302 that is configured to capture images 303. The barcode-reading device 301 also includes an image processing module 308. The barcode-reading device 301 can also include the additional components described above in connection with FIG. 1B. FIG. 3 also shows an object 304 that is moving relative to the barcode-reading device 301. A barcode 305 is positioned on the object 304.

The system also includes an actuator 307. However, unlike the barcode-reading devices 101, 201 described previously, in the depicted system 300 the actuator 307 is not included in the barcode-reading device 301 itself. Instead, the actuator 307 is external to the barcode-reading device 301. Thus, instead of moving a component within the camera 302 of the barcode-reading device 301 (as in the embodiments described previously), the actuator 307 moves the barcode-reading device 301 itself in order to reduce the relative velocity between the object 304 and the image sensor (not shown) within the camera 302.

More specifically, similar to the image processing modules 108, 208 in the barcode-reading devices 101, 201 described previously, the image processing module 308 in the barcode-reading device 301 processes images 303 of the object 304 captured by the camera 302 to determine the relative velocity of the object 304. The image processing module 308 also sends control signals 309 to the actuator 307 based on the results of processing the images 303. However, in contrast to the control signals 109, 209 in the barcode-reading devices 101, 201 described previously, the control signals 309 in the depicted barcode-reading device 301 cause the actuator 307 to move the barcode-reading device 301 itself (instead of moving a camera component, such as a moveable image sensor 106 or one or more optical components 217) in order to reduce the relative velocity between the object 304 and the image sensor (not shown) within the camera 302.

Various types of actuators 307 can be used. In some non-limiting implementations, the actuator 307 can include a servo pan/tilt motor.

FIGS. 4A-4G illustrate another example of a system 400 that is configured for improving image quality in accordance with the present disclosure. In the depicted system 400, a barcode-reading device 401 reads barcodes affixed to objects that are traveling along a conveyor belt 418. An actuator 407 (shown in FIG. 4F) controls movement of the barcode-reading device 401 in such a way that the barcode-reading device 401 follows the objects as they travel along the conveyor belt 418. This allows the camera 402 (also shown in FIG. 4F) within the barcode-reading device 401 to remain aimed at the objects while the camera 402 is capturing images of the objects, even though the objects are in motion.

The conveyor belt 418 transports objects in a substantially straight line from a back end 419 of the conveyor belt 418 to a front end 420 of the conveyor belt 418. This direction will be referred to as the forward direction. The opposite direction will be referred to as the backward direction. FIGS. 4A-4D show the system 400 from the side of the conveyor belt 418.

Figure 4A:
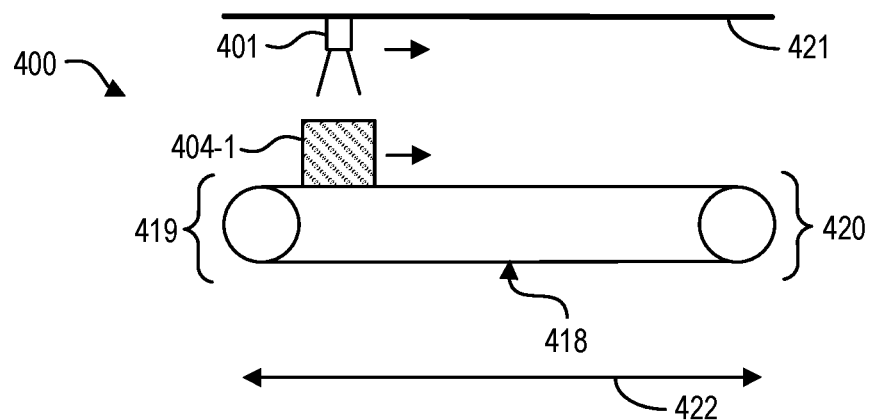
FIGS. 4A-4G illustrate an example of a system in which a barcode-reading device reads barcodes affixed to objects that are traveling along a conveyor belt, the barcode-reading device being coupled to a track, and the system including an actuator that controls movement of the barcode-reading device along the track such that the barcode-reading device follows the objects as they travel along the conveyor belt.
Figure 4B:
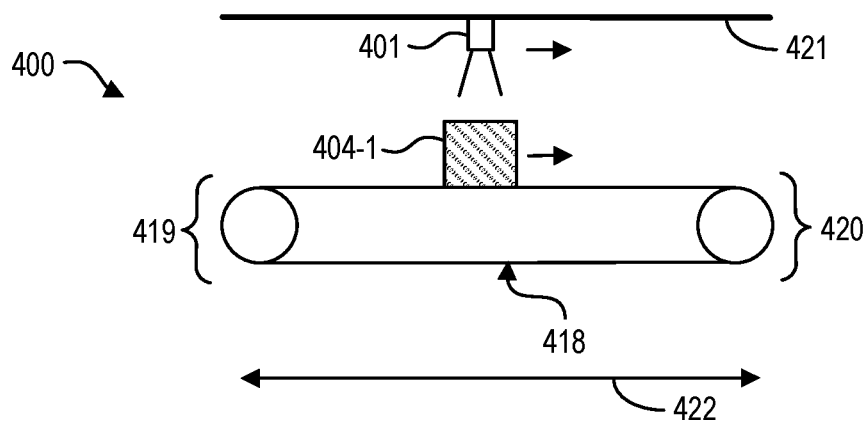
Figure 4C:
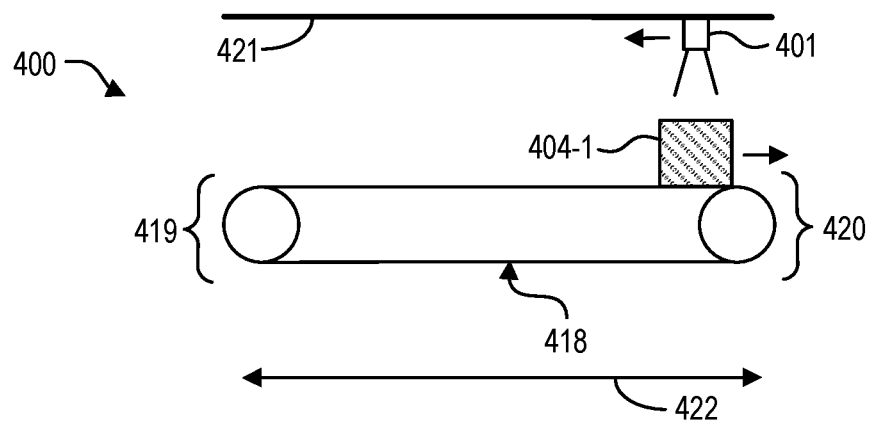
Figure 4D:
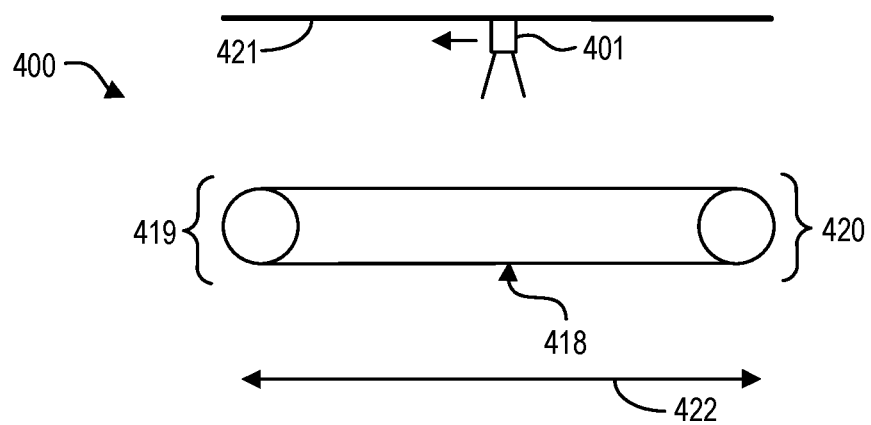
Figure 4E:
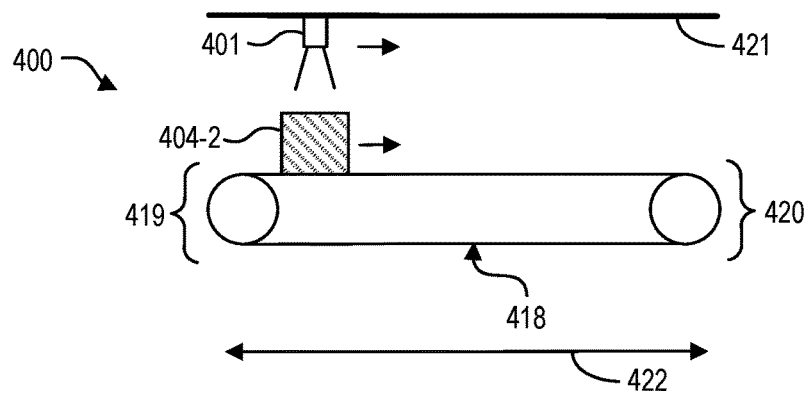
Figure 4F:
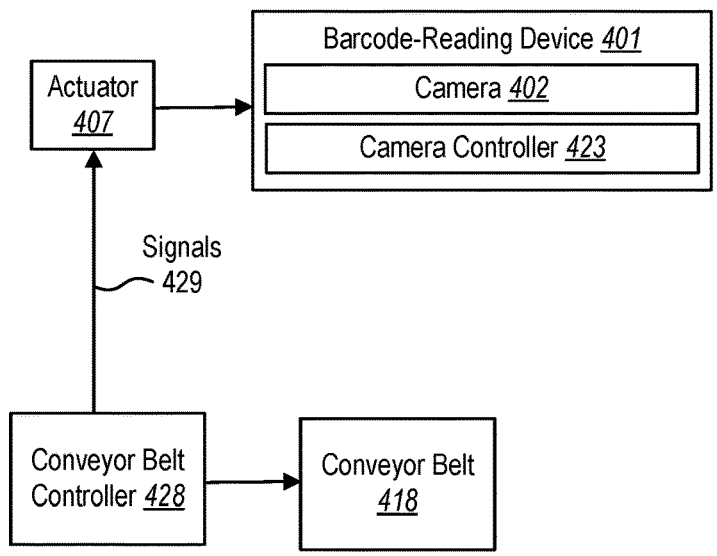
Figure 4G:
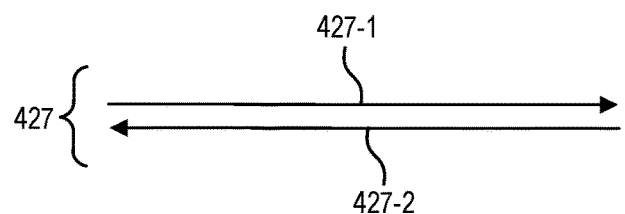

The actuator 407 causes the barcode-reading device 401 to move along a pre-defined path 427 (which is shown in FIG. 4G). During part of the pre-defined path 427, the velocity condition and the field of view condition (as those terms are defined above) are satisfied. FIG. 4G shows the pre-defined path 427 as including a first part 427-1 and a second part 427-2. As will be described in greater detail below, the velocity condition and the field of view condition are satisfied during the first part 427-1 of the pre-defined path 427. However, the velocity condition is not satisfied during the second part 427-2 of the pre-defined path 427.

In the system 400 shown in FIGS. 4A-4G, the pre-defined path 427 is a straight line. The barcode-reading device 401 is coupled to a track 421 that runs parallel to the length 422 of the conveyor belt 418. The actuator 407 causes the barcode-reading device 401 to move back and forth in a straight line along this track. During the first part 427-1 of the pre-defined path 427, the actuator 407 causes the barcode-reading device 401 to move in a forward direction from the back end 419 of the conveyor belt 418 to the front end 420 of the conveyor belt 418. Conversely, during the second part 427-2 of the pre-defined path 427, the actuator 407 causes the barcode-reading device 401 to move in a backward direction from the front end 420 of the conveyor belt 418 to the back end 419 of the conveyor belt 418.

The actuator 407 causes the barcode-reading device 401 to alternate between the first part 427-1 and the second part 427-2 of the pre-defined path 427. After the barcode-reading device 401 has moved in the forward direction along the first part 427-1 of the pre-defined path 427 and reached the front end 420 of the conveyor belt 418, the actuator 407 causes the barcode-reading device 401 to change directions and start moving in the backward direction along the second part 427-2 of the pre-defined path 427. Conversely, after the barcode-reading device 401 has moved in the backward direction along the second part 427-2 of the pre-defined path 427 and reached the back end 419 of the conveyor belt 418, the actuator 407 causes the barcode-reading device 401 to change directions and start moving in the forward direction along the first part 427-1 of the pre-defined path 427. This process continues as the actuator 407 causes the barcode-reading device 401 to move back and forth between the back end 419 of the conveyor belt 418 and the front end 420 of the conveyor belt 418.

As noted above, the velocity condition and the field of view condition are satisfied during the first part 427-1 of the pre-defined path 427. More specifically, the velocity condition is satisfied because during the first part 427-1 of the pre-defined path 427, the actuator 407 causes the barcode-reading device 401 to move in the direction of motion of the conveyor belt 418 (namely, the forward direction) at a speed that is substantially similar to the speed of the conveyor belt 418. Thus, during the first part 427-1 of the pre-defined path 427, the barcode-reading device 401 moves in the same direction and at substantially the same speed as the objects on the conveyor belt 418. The field of view condition is satisfied during the first part 427-1 of the pre-defined path 427 because the barcode-reading device 401 is positioned above the conveyor belt and oriented such that at least part of the conveyor belt 418 is located within the field of view of the camera 402. Because the velocity condition and the field of view condition are satisfied during the first part 427-1 of the pre-defined path 427, the camera 402 within the barcode-reading device 401 can follow and remain aimed at objects as they travel along the conveyor belt 418 while the barcode-reading device 401 moves along the first part 427-1 of the pre-defined path 427.

A camera controller 423 (shown in FIG. 4F) causes the camera 402 to capture images while the barcode-reading device 401 is moving along the first part 427-1 of the pre-defined path 427. Because the velocity condition and the field of view condition are satisfied when the images are captured, the images should be substantially free of image blur and image distortion.

To more clearly illustrate how the actuator 407 causes the barcode-reading device 401 to move along the pre-defined path 427, FIGS. 4A-4E show "snapshots" of the system 400 at different points in time.

FIG. 4A shows the system 400 at a first point in time ($t_1$). A first object 404-1 has been placed on the conveyor belt 418. A barcode (not shown) is affixed to the first object 404-1. The first object 404-1 is positioned near the back end 419 of the conveyor belt 418. The first object 404-1 moves along the conveyor belt 418 in the forward direction. The barcode-reading device 401 is positioned above the first object 404-1, such that the first object 404-1 is located within the field of view of the camera 402 within the barcode-reading device 401. The actuator 407 causes the barcode-reading device 401 to move along the first part 427-1 of the pre-defined path 427. In other words, the actuator 407 causes the barcode-reading device 401 to move in the forward direction at substantially the same speed as the conveyor belt 418.

FIG. 4B shows the system 400 at a second point in time ($t_2$), which occurs after $t_1$. At $t_2$, both the first object 404-1 and the barcode-reading device 401 are positioned between the back end 419 and the front end 420 of the conveyor belt 418. The actuator 407 continues to cause the barcode-reading device 401 to move along the first part 427-1 of the pre-defined path 427. In other words, the actuator 407 continues to cause the barcode-reading device 401 to move in the forward direction and at substantially the same speed as the conveyor belt 418. Thus, the barcode-reading device 401 remains positioned above the first object 404-1, and the first object 404-1 remains visible within the field of view of the camera 402 within the barcode-reading device 401, as both the barcode-reading device 401 and the first object 404-1 move in the forward direction.

FIG. 4C shows the system 400 at a third point in time ($t_3$), which occurs after $t_2$. At $t_3$, both the first object 404-1 and the barcode-reading device 401 have reached the front end 420 of the conveyor belt 418. At this point, the actuator 407 causes the barcode-reading device 401 to change directions and begin moving along the second part 427-2 of the pre-defined path 427. In other words, the actuator 407 causes the barcode-reading device 401 to begin moving in the backward direction, which is opposite the direction of the conveyor belt 418.

FIG. 4D shows the system 400 at a fourth point in time ($t_4$), which occurs after $t_3$. At $t_4$, the barcode-reading device 401 is positioned between the front end 420 and the back end 419 of the conveyor belt 418. The actuator 407 continues to cause the barcode-reading device 401 to move along the second part 427-2 of the pre-defined path 427 in the backward direction.

FIG. 4E shows the system 400 at a fifth point in time ($t_5$), which occurs after $t_4$. At $t_5$, the barcode-reading device 401 is positioned near the back end 419 of the conveyor belt 418. A second object 404-2 has been placed on the conveyor belt 418. The actuator 407 causes the barcode-reading device 401 to change directions once again in order to follow the second object 404-2 as the second object 404-2 moves along the conveyor belt 418, in a similar manner to the way that the barcode-reading device 401 followed the first object 404-1 (as shown in FIGS. 4A-4C).

In some implementations, the camera controller 423 causes the camera 402 to capture images only when the barcode-reading device 401 is moving along the first part 427-1 of the pre-defined path 427. In other words, the camera controller 423 causes the camera 402 to capture images when the barcode-reading device 401 moves along the first part 427-1 of the pre-defined path 427 (in the forward direction) but not when the barcode-reading device 401 moves along the second part 427-2 of the pre-defined path 427 (in the backward direction). In such implementations, the camera controller 423 can receive a signal from the actuator 407 (or from another device, such as a device that controls the actuator 407) whenever the actuator 407 causes the barcode-reading device 401 to change directions and switch between the first part 427-1 and the second part 427-2 of the pre-defined path 427. Alternatively, the camera controller 423 can predict when the actuator 407 is going to cause the barcode-reading device 401 to change directions and switch between the first part 427-1 and the second part 427-2 of the pre-defined path 427 based on pre-defined timing. For example, if the camera controller 423 knows that the actuator 407 is going to cause the barcode-reading device 401 to change directions and switch between the first part 427-1 and the second part 427-2 of the pre-defined path 427 every N seconds, then the camera controller 423 can switch between causing the camera 402 to capture images and causing the camera 402 to not capture images every N seconds without any signals being sent to the camera controller 423.

In some implementations, the camera controller 423 causes the camera 402 to capture images both when the barcode-reading device 401 moves along the first part 427-1 of the pre-defined path 427 and also when the barcode-reading device 401 moves along the second part 427-2 of the pre-defined path 427. In such implementations, only the images captured when the barcode-reading device 401 moves along the first part 427-1 of the pre-defined path 427 would have the benefits of reduced image blur and reduced image distortion.

In some implementations, the speed of the barcode-reading device 401 can be based on signals 429 that the actuator 407 receives from a device that controls the conveyor belt 418. Such a device is shown as a conveyor belt controller 428 in FIG. 4F. The signals 429 can indicate the speed of the conveyor belt 418, and the actuator 407 can set and subsequently adjust the speed of the barcode-reading device 401 based on these signals 429. If the conveyor belt controller 428 subsequently changes (increases or decreases) the speed of the conveyor belt 418, this can be communicated to the actuator 407 via the signals 429. In response to receiving the signals 429, the actuator 407 can adjust the speed of the barcode-reading device 401 to match (or substantially match) the new speed of the conveyor belt 418.

Alternatively, in other implementations, the actuator 407 may know the speed of the conveyor belt 418 independently of any signals 429 received from the conveyor belt 418 or the conveyor belt controller 428. In such implementations, the actuator 407 may set the speed of the barcode-reading device 401 based on its knowledge of the speed of the conveyor belt 418. For example, the actuator 407 may not be communicatively coupled to the conveyor belt 418 or the conveyor belt controller 428, but an individual with knowledge of the speed of the conveyor belt 418 may program the actuator 407 to cause the barcode-reading device 401 to move along the first part 427-1 of the pre-defined path 427 at the same speed (or substantially the same speed) as the speed of the conveyor belt 418.

In the embodiment shown in FIGS. 4A-G, at least part of the conveyor belt 418 is located within the field of view of the camera 402 at all times while the barcode-reading device 401 moves along the pre-defined path 427. In other words, at least part of the conveyor belt 418 is located within the field of view of the camera 402 both while the barcode-reading device 401 moves along the first part 427-1 of the pre-defined path 427 (i.e., in the forward direction) and also while the barcode-reading device 401 moves along the second part 427-2 of the pre-defined path 427 (i.e., in the backward direction). However, this is not necessary. In some alternative embodiments, the conveyor belt 418 may not be located within the field of view of the camera 402 during the entire pre-defined path 427. Some examples of such embodiments will be described below.

In some implementations, the actuator 407 can cause the barcode-reading device 401 to travel at the same speed (although in opposite directions) along the first part 427-1 and the second part 427-2 of the pre-defined path 427. Alternatively, the actuator 407 can cause the barcode-reading device 401 to travel at different speeds along the first part 427-1 and the second part 427-2 of the pre-defined path 427. For example, whereas the actuator 407 causes the barcode-reading device 401 to move at substantially the same speed as the objects on the conveyor belt 418 when the barcode-reading device 401 moves in the forward direction along the first part 427-1 of the pre-defined path 427, the actuator 407 can cause the barcode-reading device 401 to move at a faster speed when the barcode-reading device 401 moves in the backward direction along the second part 427-2 of the pre-defined path 427.

In the system 400 just described, the path 427 followed by the barcode-reading device 401 is linear. In an alternative embodiment, the path could be a looped path. For example, a barcode-reading device could be coupled to a looped track, and an actuator could cause the barcode-reading device to move around the looped track.

In another alternative embodiment, more than one barcode-reading device could be positioned along the looped track. For example, at least two barcode-reading devices could be utilized, so that one barcode-reading device is moving in the direction of motion of the conveyor belt while another barcode-reading device is moving back into position. Depending on the number of barcode-reading devices involved, this could provide additional coverage of the conveyor belt and the objects in motion on it.

Figure 8:
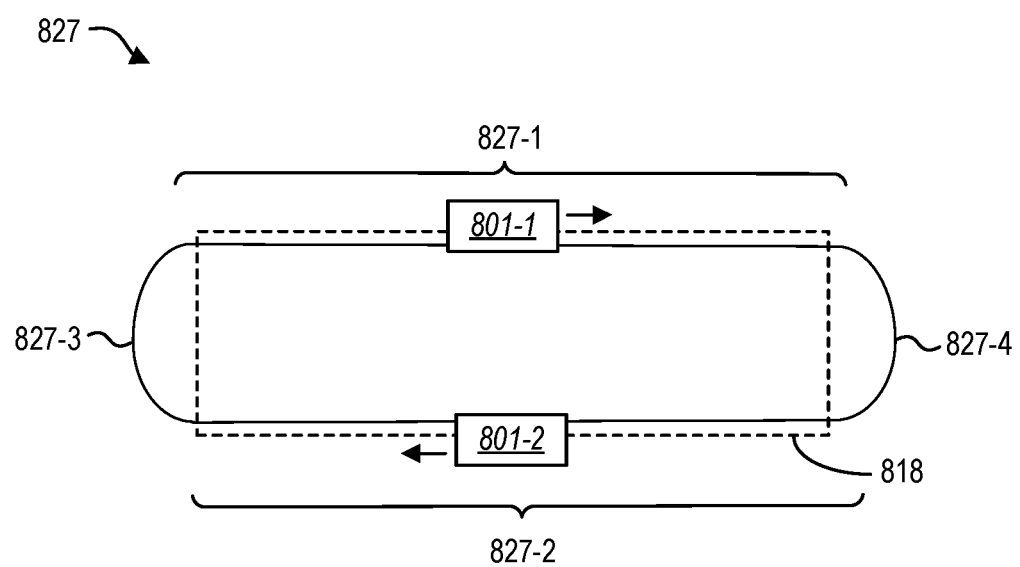
FIG. 8 illustrates a system in which a plurality of barcode-reading devices move along a looped track.

FIG. 8 illustrates an example of a looped path 827. FIG. 8 illustrates how the looped path 827 appears from a top-down view, with a conveyor belt shown in dotted lines. In the depicted embodiment, the looped path 827 includes a first substantially linear portion 827-1 and a second substantially linear portion 827-2. The looped path 827 also includes two curved end portions 827-3, 827-4. An actuator causes a first barcode-reading device 801-1 and a second barcode-reading device 801-2 to move along the looped path 827.

FIG. 8 shows the first barcode-reading device 801-1 moving in a forward direction along the first substantially linear portion 827-1 of the looped path 827. For purposes of the present example, it will be assumed that objects move along the conveyor belt 818 in the forward direction. FIG. 8 shows the second barcode-reading device 801-2 moving in a backward direction along the second substantially linear portion 827-2 of the looped path 827.

The path 827 followed by the first barcode-reading device 801-1 will now be described. As indicated above, the first barcode-reading device 801-1 is shown moving in a forward direction along the first substantially linear portion 827-1 of the looped path 827. When the first barcode-reading device 801-1 reaches the end of the first substantially linear portion 827-1 of the looped path 827, the first barcode-reading device 801-1 will move around the curved portion 827-4 until it reaches the second substantially linear portion 827-2 of the looped path 827. The first barcode-reading device 801-1 then moves in a backward direction along the second substantially linear portion 827-2 of the looped path 827 until it reaches the end of the second substantially linear portion 827-2 of the looped path 827. At this point, the first barcode-reading device 801-1 moves around the curved portion 827-3 until it returns to the first substantially linear portion 827-1 of the looped path 827. Then the overall path 827 is repeated. The second barcode-reading device 801-2 follows a similar path 827.

When either the first barcode-reading device 801-1 or the second barcode-reading device 801-2 is moving along the first substantially linear portion 827-1 of the looped path 827, the velocity condition and the field of view condition (as those terms are described above) are satisfied. However, these conditions are not satisfied in other portions of the looped path 827.

In an alternative embodiment, the looped path could be a different shape, such as a circular path, an elliptical path, or the like.

In an alternative embodiment, only the cameras of the barcode-reading devices 801-1, 801-2 could be moved along the looped path 827. These cameras could be communicatively coupled to computing devices that perform decoding and potentially other actions (e.g., image processing).

FIGS. 5A-5F illustrate another example of a system 500 that is configured for improving image quality in accordance with the present disclosure. The system 500 shown in FIGS. 5A-5F is similar in some respects to the system 400 that was described previously in connection with FIGS. 4A-4G. For example, a barcode-reading device 501 reads barcodes affixed to objects that are traveling along a conveyor belt 518. The barcode-reading device 501 includes a camera, which can be similar to the camera 402 shown in FIG. 4F. An actuator 507 controls movement of the barcode-reading device 501 in such a way that the barcode-reading device 501 follows the objects as they travel along the conveyor belt 518. FIGS. 5A-5E once again show the system 500 from the side of the conveyor belt 518.

Figure 5A:
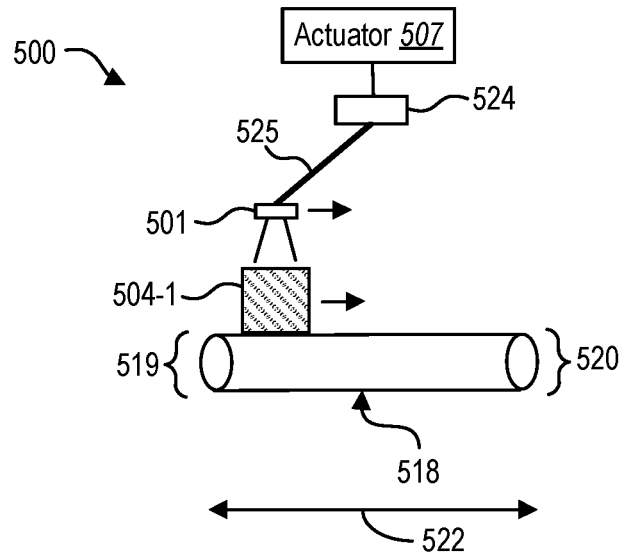
FIGS. 5A-5F illustrate a system that is similar to the system shown in FIGS. 4A-4G, except that the actuator causes the barcode-reading device to swing as a pendulum parallel to the length of the conveyor belt.
Figure 5B:
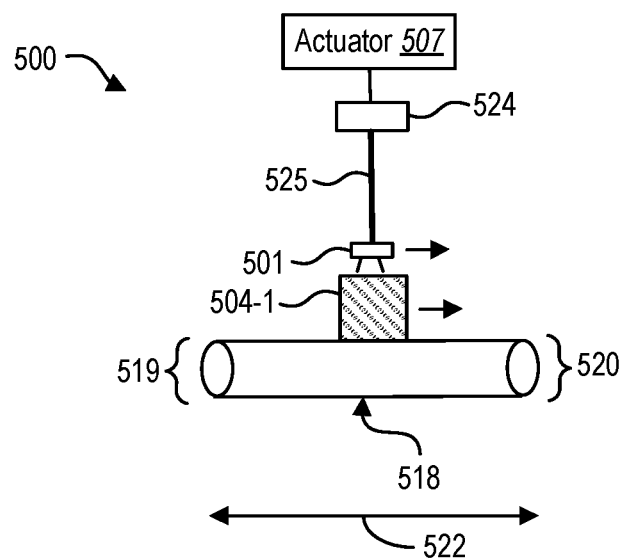
Figure 5C:
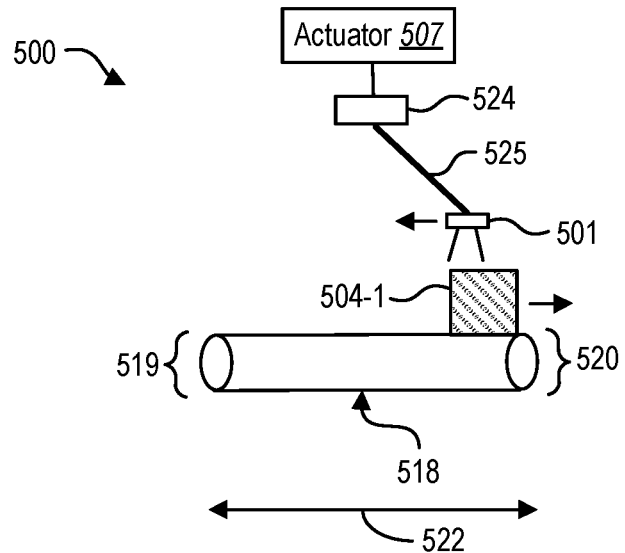
Figure 5D:
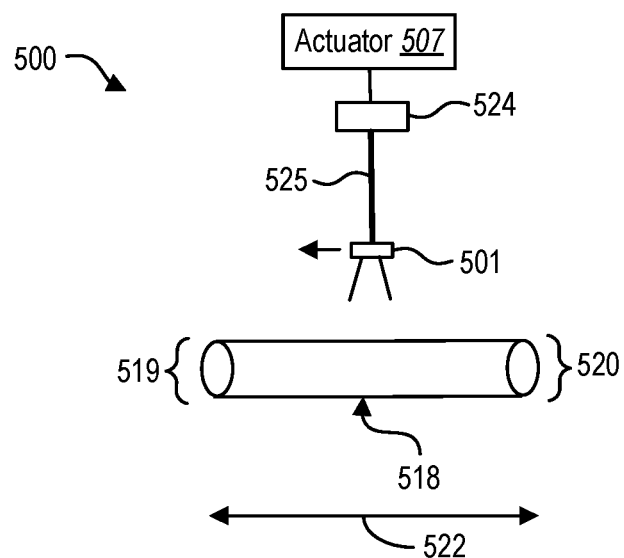
Figure 5E:
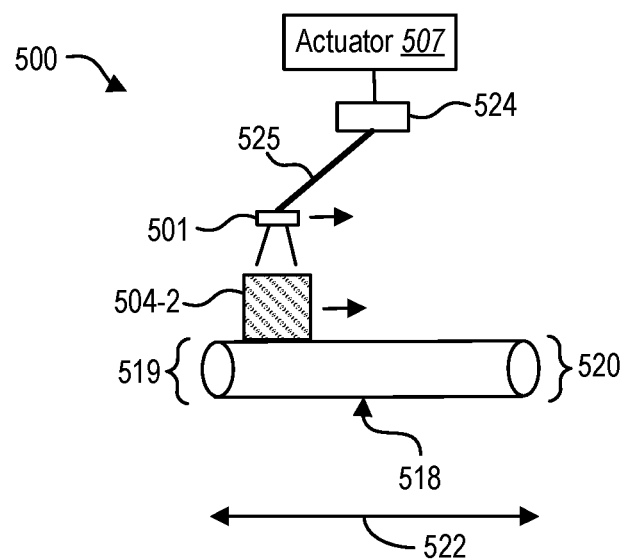
Figure 5F:
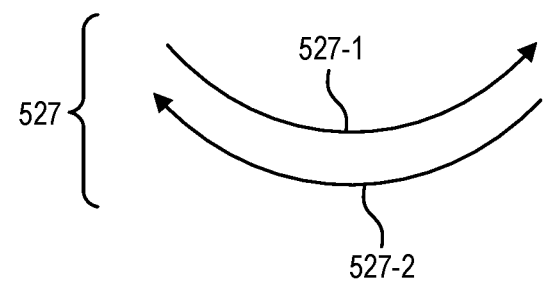

Like the actuator 407 in the system 400 described previously, the actuator 507 causes the barcode-reading device 501 to move along a pre-defined path 527 (which is shown in FIG. 5F). As in the system 400 described previously, the velocity condition and the field of view condition are satisfied during part of the pre-defined path 527. FIG. 5F shows the pre-defined path 527 as including (i) a first part 527-1, during which the velocity condition and the field of view condition are satisfied, and (ii) a second part 527-2, during which the velocity condition is not satisfied.

In the depicted embodiment, the actuator 507 is coupled to a motor 524, which is coupled to a shaft 525. The motor 524 causes the shaft 525 to swing as a pendulum parallel to the length 522 of the conveyor belt 518. Because the barcode-reading device 501 is coupled to the shaft 525, the motion of the shaft 525 causes the barcode-reading device 501 to swing as a pendulum between the back end 519 and the front end 520 of the conveyor belt 518.

The first part 527-1 of the pre-defined path 527 corresponds to the first half of the pendulum's period, during which the barcode-reading device 501 swings from the back end 519 toward the front end 520 of the conveyor belt 518. The second part 527-2 of the pre-defined path 527 corresponds to the second half of the pendulum's period, during which the barcode-reading device 501 swings from the front end 520 toward the back end 519 of the conveyor belt 518. The barcode-reading device 501 swings back and forth between the back end 519 and the front end 520 of the conveyor belt 518, thereby alternating between the first part 527-1 and the second part 527-2 of the pre-defined path 527.

As noted above, the velocity condition and the field of view condition are satisfied during the first part 527-1 of the pre-defined path 527. More specifically, these conditions are satisfied because when the barcode-reading device 501 is moving along the first part 527-1 of the pre-defined path 527 (i.e., swinging from the back end 519 of the conveyor belt 518 toward the front end 520 of the conveyor belt 518 in the forward direction), the speed of the barcode-reading device 501 in the forward direction is substantially similar to the speed of the conveyor belt 518 and at least part of the conveyor belt 518 is located within the field of view of the camera within the barcode-reading device 501. Because the velocity condition and the field of view condition are satisfied, the camera within the barcode-reading device 501 can follow and remain aimed at objects as they travel along the conveyor belt 518 while the barcode-reading device 501 moves along the first part 527-1 of the pre-defined path 527.

A camera controller (which can be similar to the camera controller 423 described previously) causes the camera in the barcode-reading device 501 to capture images while the barcode-reading device 501 is moving along the first part 527-1 of the pre-defined path. Because the velocity condition and the field of view condition are satisfied when the images are captured, the images should be substantially free of image blur and image distortion.

To more clearly illustrate how the actuator 507 causes the barcode-reading device 501 to move along the pre-defined path, FIGS. 5A-5E show "snapshots" of the conveyor belt 518 at different points in time.

FIG. 5A shows the conveyor belt 518 at a first point in time ($t_1$). A first object 504-1 has been placed on the conveyor belt 518. A barcode (not shown) is affixed to the first object 504-1. The first object 504-1 is positioned near the back end 519 of the conveyor belt 518. The first object 504-1 moves along the conveyor belt 518 in the forward direction. The barcode-reading device 501 is positioned above the first object 504-1, such that the first object 504-1 is located within the field of view of the camera within the barcode-reading device 501. The actuator 507 causes the barcode-reading device 501 to move along the first part 527-1 of the pre-defined path 527 by swinging from the back end 519 of the conveyor belt 518 toward the front end 520 of the conveyor belt 518. As noted above, when the barcode-reading device 501 moves along the first part 527-1 of the pre-defined path 527, the barcode-reading device 501 is moving in the same direction as the conveyor belt 518 (i.e., the forward direction) and the speed of the barcode-reading device 501 in the forward direction is substantially similar to the speed of the conveyor belt 518.

FIG. 5B shows the conveyor belt 518 at a second point in time ($t_2$), which occurs after $t_1$. At $t_2$, both the first object 504-1 and the barcode-reading device 501 are positioned between the back end 519 and the front end 520 of the conveyor belt 518. The actuator 507 continues to cause the barcode-reading device 501 to move along the first part 527-1 of the pre-defined path 527 by swinging in the same direction as the conveyor belt 518 (i.e., the forward direction) toward the front end 520 of the conveyor belt 518. The speed at which the barcode-reading device 501 is moving in the forward direction continues to be substantially similar to the speed of the conveyor belt 518. Thus, the barcode-reading device 501 remains positioned above the first object 504-1, with the first object 504-1 located within the field of view of the camera within the barcode-reading device 501, as the first object 504-1 moves along the conveyor belt 518 in the forward direction.

FIG. 5C shows the conveyor belt 518 at a third point in time ($t_3$), which occurs after $t_2$. At $t_3$, both the first object 504-1 and the barcode-reading device 501 have reached the front end 520 of the conveyor belt 518. At this point, the actuator 507 causes the barcode-reading device 501 to change directions and begin moving along the second part 527-2 of the pre-defined path 527. In other words, the actuator 507 causes the barcode-reading device 501 to begin swinging in the opposite direction, from the front end 520 of the conveyor belt 518 toward the back end 519 of the conveyor belt 518.

FIG. 5D shows the conveyor belt 518 at a fourth point in time ($t_4$), which occurs after $t_3$. At $t_4$, the barcode-reading device 501 is positioned between the front end 520 and the back end 519 of the conveyor belt 518. The actuator 507 continues to cause the barcode-reading device 501 to move along the second part 527-2 of the pre-defined path 527 by swinging toward the back end 519 of the conveyor belt 518.

FIG. 5E shows the conveyor belt 518 at a fifth point in time ($t_5$), which occurs after $t_4$. At $t_5$, the barcode-reading device 501 has finished moving along the second part 527-2 of the pre-defined path 527 and is positioned near the back end 519 of the conveyor belt 518. A second object 504-2 has been placed on the conveyor belt 518. The actuator 507 causes the barcode-reading device 501 to change directions once again and start moving along the first part 527-1 of the pre-defined path 527 by swinging toward the front end 520 of the conveyor belt 518. Thus, the barcode-reading device 501 follows the second object 504-2 as the second object 504-2 moves along the conveyor belt 518, in a similar manner to the way that the barcode-reading device 501 followed the first object 504-1 (as shown in FIGS. 5A-C).

FIGS. 6A-6E illustrate another example of a system 600 that is configured for improving image quality in accordance with the present disclosure. The system 600 shown in FIGS. 6A-6E is similar in some respects to the systems 400, 500 that were described previously in connection with FIGS. 4A-4G and 5A-5F. For example, a barcode-reading device 601 reads barcodes affixed to objects that are traveling along a conveyor belt 618. The barcode-reading device 601 includes a camera, which can be similar to the camera 402 shown in FIG. 4F. An actuator 607 controls movement of the barcode-reading device 601 in such a way that the barcode-reading device 601 follows the objects as they travel along the conveyor belt 618.

Figure 6A:
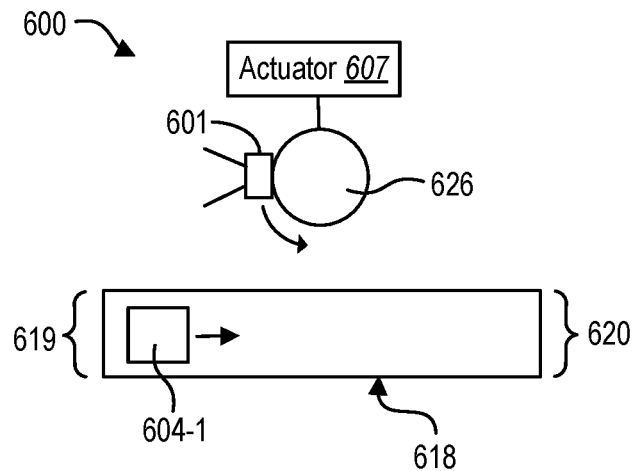
FIGS. 6A-6E illustrate another system that is similar to the system shown in FIGS. 4A-4G, except that the actuator causes the barcode-reading to rotate along a circular path.
Figure 6B:
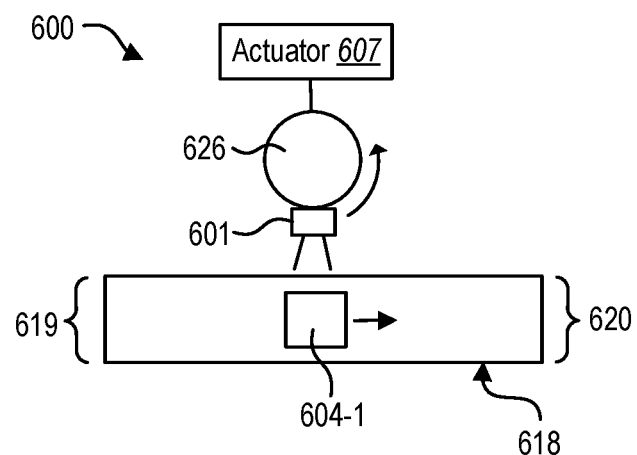
Figure 6C:
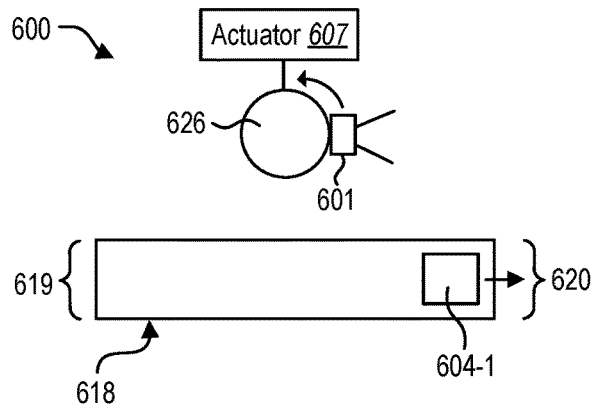
Figure 6D:
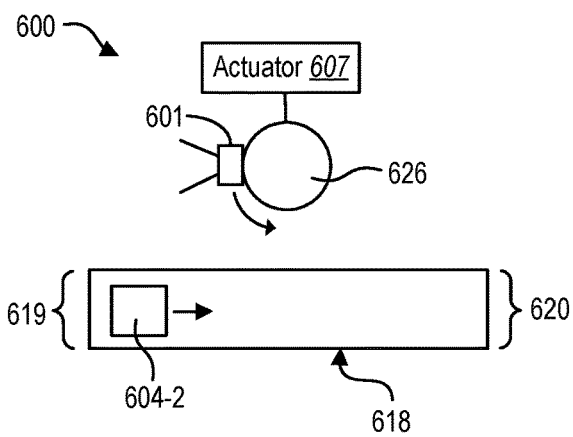
Figure 6E:
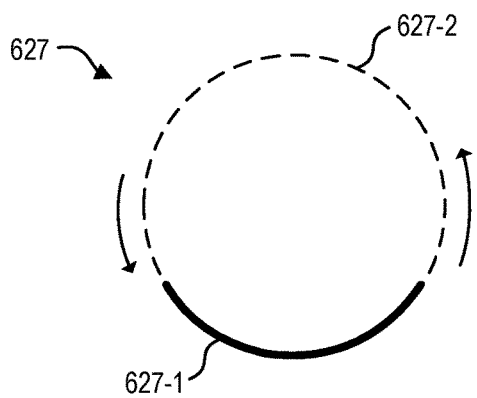

Like the actuators 407, 507 in the systems 400, 500 described previously, the actuator 607 causes the barcode-reading device 601 to move along a pre-defined path 627 (which is shown in FIG. 6E). As in the systems 400, 500 described previously, the velocity condition and the field of view condition (as those terms are above) are satisfied during part of the pre-defined path 627. FIG. 6E shows the pre-defined path 627 as including (i) a first part 627-1, shown in solid lines, during which the velocity condition and the field of view condition are satisfied, and (ii) a second part 627-2, shown in dotted lines, during which the velocity condition and the field of view condition are not satisfied.

In the system 600 shown in FIGS. 6A-6E, the pre-defined path 627 is circular. The barcode-reading device 601 is coupled to a rotatable shaft 626. The actuator 607 causes the shaft 626 to rotate. Because the barcode-reading device 601 is coupled to the shaft 626, the rotation of the shaft 626 causes the barcode-reading device 601 to move along a circular pre-defined path 627. To more clearly illustrate the circular pre-defined path 627, FIGS. 6A-6E show a top-down view of the system 600.

As noted above, the velocity condition and the field of view condition are satisfied during the first part 627-1 of the circular pre-defined path 627. More specifically, the velocity condition is satisfied because the first part 627-1 is the portion of the circular path 627 when the speed of the barcode-reading device 601 in the direction of motion of the conveyor belt 618 (namely, the forward direction) is substantially similar to the speed of the conveyor belt 618. The field of view condition is satisfied because the first part 627-1 is the portion of the circular path 627 when at least part of the conveyor belt 618 is located within the field of view of the camera within the barcode-reading device 601. Because the velocity condition and the field of view condition are satisfied during the first part 627-1 of the circular pre-defined path 627, the camera within the barcode-reading device 601 can follow and remain aimed at objects as they travel along the conveyor belt 618 while the barcode-reading device 601 moves along the first part 627-1 of the circular pre-defined path 627.

A camera controller (which can be similar to the camera controller 423 described previously) causes the camera in the barcode-reading device 601 to capture images while the barcode-reading device 601 is moving along the first part 627-1 of the circular pre-defined path 627. Because the velocity condition and the field of view condition are satisfied when the images are captured, the images should be substantially free of image blur and image distortion.

To more clearly illustrate how the actuator 607 causes the barcode-reading device 601 to move along the circular pre-defined path 627, FIGS. 6A-6D show "snapshots" of the system 600 at different points in time.

FIG. 6A shows the system 600 at a first point in time ($t_1$). A first object 604-1 has been placed on the conveyor belt 618. A barcode (not shown) is affixed to the first object 604-1. The first object 604-1 is positioned near the back end 619 of the conveyor belt 618. The first object 604-1 moves along the conveyor belt 618 in the forward direction toward the front end 620. The barcode-reading device 601 is coupled to the shaft 626, which is positioned to the side of the conveyor belt 618. The actuator 607 causes the shaft 626 to rotate, which causes the barcode-reading device 601 to move along the circular pre-defined path 627. At $t_1$, the barcode-reading device 601 is near the end of the second part 627-2 of the circular pre-defined path 627 and rotating toward the first part 627-1. Neither the velocity condition nor the field of view condition is satisfied at $t_1$.

FIG. 6B shows the system 600 at a second point in time ($t_2$), which occurs after $t_1$. At $t_2$, the first object 604-1 is positioned between the back end 619 and the front end 620 of the conveyor belt 618. The barcode-reading device 601 is in the first part 627-1 of the circular pre-defined path 627, so the velocity condition and the field of view condition are satisfied. In other words, the speed of the barcode-reading device 601 in the forward direction is substantially the same as the speed of the conveyor belt 618, and at least part of the conveyor belt 618 (specifically, the part of the conveyor belt 618 that includes the first object 604-1) is located within the field of view of the camera within the barcode-reading device 601. Thus, the camera within the barcode-reading device 601 is able to follow the first object 604-1 as the first object 604-1 moves in the forward direction along the conveyor belt 618.

FIG. 6C shows the system 600 at a third point in time ($t_3$), which occurs after $t_2$. At $t_3$, the first object 604-1 has reached the front end 620 of the conveyor belt 618. At this point, the barcode-reading device 601 has completed the first part 627-1 of the circular pre-defined path 627 and is just starting the second part 627-2. Neither the velocity condition nor the field of view condition is satisfied at $t_3$.

FIG. 6D shows the system 600 at a fourth point in time ($t_4$), which occurs after $t_3$. At $t_4$, a second object 604-2 has been placed on the conveyor belt 618, near the back end 619. The second object 604-2 is moving along the conveyor belt 618 in the forward direction, from the back end 619 toward the front end 620. The barcode-reading device 601 has moved so that it is once again near the end of the second part 627-2 of the circular pre-defined path 627 and is rotating toward the first part 627-1. Neither the velocity condition nor the field of view condition is satisfied at $t_4$. However, these conditions will once again be satisfied when the barcode-reading device 601 enters the first part 627-1 of the circular pre-defined path 627. This will allow the camera within the barcode-reading device 601 to follow the second object 604-2 as the second object 604-2 moves along the conveyor belt 618, in a similar manner to the way that the camera within the barcode-reading device 601 followed the first object 604-1 (as shown in FIGS. 6A-6C).

In the embodiment shown in FIGS. 6A-6E, the barcode-reading device 601 follows a circular path 627 while being positioned to the side of the conveyor belt 618. In an alternative embodiment, a barcode-reading device could follow a circular path while being positioned above a conveyor belt. For example, as noted above, a barcode-reading device could be coupled to a circular track, and an actuator could cause the barcode-reading device to move around the circular track.

Figure 7A:
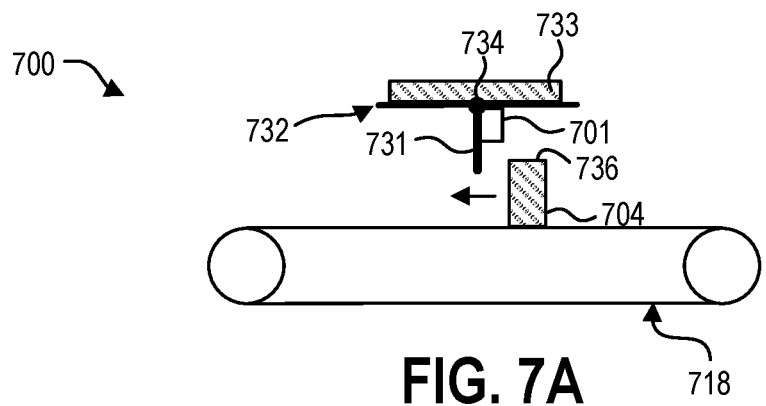
FIGS. 7A-7C illustrate a system in which an appendage is affixed to a barcode-reading device and the barcode-reading device is positioned so that an object on a conveyor belt collides with the appendage when the object moves past the barcode-reading device, thereby causing the barcode-reading device to rotate.
Figure 7B:
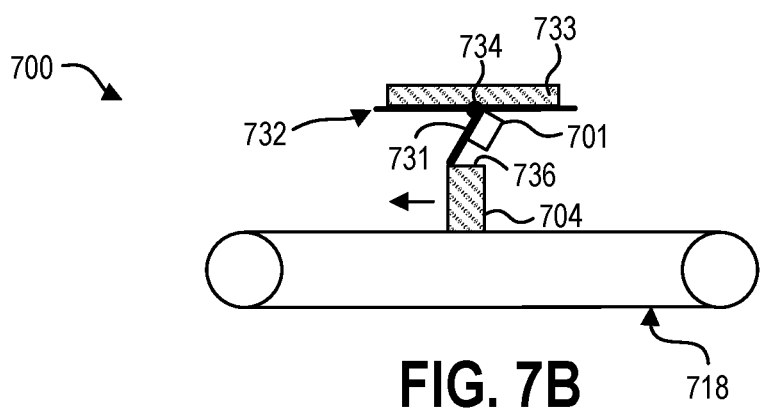
Figure 7C:
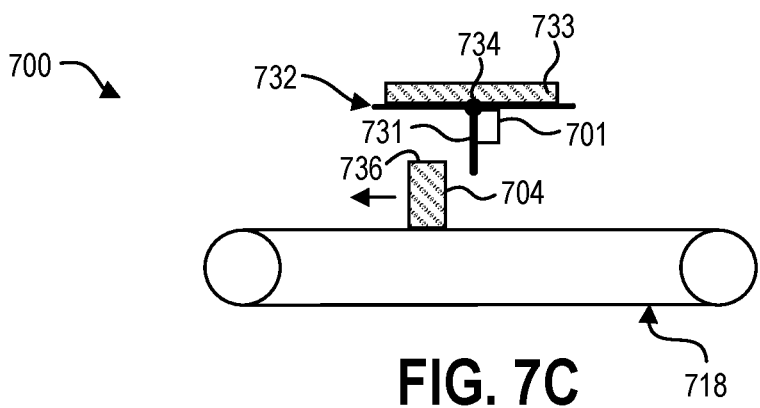

FIGS. 7A-7C illustrate another example of a system 700 that is configured for improving image quality in accordance with the present disclosure.

The system 700 shown in FIGS. 7A-7C is similar in some respects to the systems 400, 500, 600 that were described previously in connection with FIGS. 4A-4G, 5A-5F, and 6A-6E. For example, a barcode-reading device 701 reads barcodes affixed to objects that are traveling along a conveyor belt 718. The barcode-reading device 701 includes a camera, which can be similar to the camera 402 shown in FIG. 4F.

In the system 700 shown in FIGS. 7A-7C, an appendage 731 is affixed to the barcode-reading device 701. The appendage 731 is made of a rigid material that can maintain its shape when it is contacted by an object 704 moving along the conveyor belt 718.

A mounting assembly 732 is configured to attach the barcode-reading device 701 to a support structure 733 that holds the barcode-reading device 701 in place relative to the conveyor belt 718. The barcode-reading device 701 is positioned so that an object 704 on the conveyor belt 718 collides with the appendage 731 when the object 704 moves past the barcode-reading device 701. FIG. 7A shows the object 704 before it has collided with the appendage 731, and FIG. 7B shows the object 704 after it has collided with the appendage 731.

The mounting assembly 732 includes a pivot 734. The pivot 734 enables the barcode-reading device 701 to rotate when the object 704 collides with the appendage 731. The position of the object 704 in FIG. 7A can be considered to be the "resting" position of the barcode-reading device 701. This is the position of the barcode-reading device 701 when the appendage 731 is not in contact with an object 704. The position of the object 704 in FIG. 7B can be considered to be a "rotated" position of the barcode-reading device 701.

As shown in FIG. 7B, the rotation of the barcode-reading device 701 enables the camera within the barcode-reading device 701 to remain aimed at the object 704 after the object 704 has moved past the barcode-reading device 701. Stated another way, the rotation of the barcode-reading device 701 enables the camera within the barcode-reading device 701 to remain aimed at the object 704 for a longer time period than if the barcode-reading device 701 had not been rotated. Consider the position of the object 704 in FIG. 7B. If the barcode-reading device 701 had not been rotated, the camera within the barcode-reading device 701 would not be aimed at the object 704 at this point in time. However, because the collision between the object 704 and the appendage 731 causes the barcode-reading device 701 to rotate, the camera is still aimed at the object 704 at this point in time.

Enabling the camera within the barcode-reading device 701 to remain aimed at the object 704 after the object 704 has moved past the barcode-reading device 701 can help reduce image blur and image distortion as described above. Moreover, if the object 704 includes a barcode on its top surface 736, then the above-described techniques can facilitate more accurate barcode reading.

The pivot 734 includes some type of mechanism, such as a spring, that causes the barcode-reading device 701 to rotate back to its resting position after the object 704 has moved to a place where the object 704 is no longer in contact with the appendage 731. This is shown in FIG. 7C.

In the system 700 shown in FIGS. 7A-7C, the barcode-reading device 701 is positioned above the conveyor belt 718. In an alternative embodiment, the barcode-reading device could instead be positioned to the side of the conveyor belt. Such an embodiment would be useful for reading barcodes that are affixed to the sides of objects. In such an embodiment, the appendage could be oriented perpendicularly to the appendage 731 in FIGS. 7A-7C (e.g., into the page as opposed to the appendage 731, which is oriented downward).

The embodiments described herein are provided for purposes of example only; those skilled in the art will recognize many other embodiments of the inventive concepts disclosed herein.

For example, in another embodiment, a camera-based barcode-reading device can be mechanically attached to a conveyor belt with gears, chains, pulleys, or other power transmission mechanisms. This type of embodiment may or may not utilize a cam to precisely control the angle of the barcode-reading device to track the subject.

In some embodiments, one or more optical components (e.g., a prism, one or more mirrors) can be used to split a captured image into two or more fields of view. These fields of view can each support different image parameters, such as focal length, viewing direction, optical filters, and/or reference images for calibration.

In the foregoing discussion, the techniques disclosed herein were described as enabling the camera within a barcode-reading device to remain aimed at an object that is in motion while the camera is capturing an image of the object. In some embodiments, this means that the object remains in substantially the same position within the camera's field of view during the time period when the camera is capturing an image of the object.

The phrase "capturing an image" (and grammatical variants thereof) can refer to the overall process whereby light entering a camera is converted into a digital image. Under some circumstances, the phrase "capturing an image" can refer specifically to the portion of the process during which the pixels within an image sensor are exposed to light (or, stated another way, when the pixels within an image sensor are collecting light). For example, consider the statement that a barcode-reading device remains aimed at an object that is in motion while the camera is capturing an image of the object. In this statement, the phrase "capturing an image" can refer specifically to the period of time during which the pixels within an image sensor are exposed to light.

As used herein, the term "substantially" should be interpreted to mean "to a great extent or degree." In some embodiments, the speed of a first object is considered to be substantially similar to the speed of a second object if the speed of the first object is within 0.1% of the speed of the second object. In some embodiments, the speed of a first object is considered to be substantially similar to the speed of a second object if the speed of the first object is within 1% of the speed of the second object. In some embodiments, the speed of a first object is considered to be substantially similar to the speed of a second object if the speed of the first object is within 5% of the speed of the second object. In some embodiments, the speed of a first object is considered to be substantially similar to the speed of a second object if the speed of the first object is within 10% of the speed of the second object.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random-access memory (RAM), read-only memory (ROM), non-volatile random-access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

Any communication interface(s) described herein can be based on wireless communication technology and/or wired communication technology. Some examples of communication interfaces that are based on wireless communication technology include a Bluetooth wireless communication adapter, a wireless adapter that operates in accordance with an Institute of Electrical and Electronics Engineers (IEEE) 802.11 wireless communication protocol, and an infrared (IR) communication port. Some examples of communication interfaces that are based on wired communication technology include a Universal Serial Bus (USB) and an Ethernet adapter.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode-reading device, comprising:
a camera configured to capture images, the camera having a field of view;
an actuator that is configured to control movement of at least one camera component;
a processor;
memory communicatively coupled to the processor; and
an image processing module stored in the memory and executable by the processor to:
process the images captured by the camera to determine a relative velocity of an object in the field of view of the camera, the relative velocity indicating a velocity of the object relative to the camera; and
send control signals to the actuator based on results of processing the images, wherein the control signals cause the actuator to move the at least one camera component without moving the entire camera, and wherein the movement of the at least one camera component reduces the relative velocity of the object.

2. The barcode-reading device of claim 1, wherein:
the camera comprises a moveable image sensor; and
the control signals cause the actuator to move the moveable image sensor in order to reduce the relative velocity between the object and the moveable image sensor.

3. The barcode-reading device of claim 1, wherein the control signals cause the actuator to move at least one optical component of the camera in order to reduce the relative velocity between the object and an image sensor within the camera.

4. The barcode-reading device of claim 3, wherein the at least one optical component is selected from the group consisting of a mirror galvanometer or an optical wedge.

5. A system, comprising:
a barcode-reading device comprising a processor, memory communicatively coupled to the processor, and a camera configured to capture images;
an actuator that is configured to move the barcode-reading device; and
an image processing module stored in the memory and executable by the processor to:
process the images captured by the camera to determine a relative velocity of the object, the relative velocity indicating a velocity of the object relative to the camera; and
send control signals to the actuator based on results of processing the images, the control signals causing the actuator to move the barcode-reading device in order to reduce the relative velocity between the object and an image sensor within the camera.

6. A system, comprising:
a conveyor belt that is configured to transport objects at a conveyor belt speed in a first direction, the objects having barcodes affixed thereto;
a barcode-reading device comprising a first camera having a field of view;

an actuator that causes the first camera to move along a pre-defined path, wherein during a first part of the pre-defined path the first camera moves in the first direction at a speed that is substantially similar to the conveyor belt speed and the first camera is positioned so that at least part of the conveyor belt is located within the field of view of the first camera, and wherein during a second part of the pre-defined path the barcode-reading device moves in a second direction that is different from the first direction; and a camera controller that is configured to cause the first camera to capture images while the barcode-reading device moves along the first part of the pre-defined path, the camera controller being additionally configured to cause the first camera to not capture images when the barcode-reading device moves along the second part of the pre-defined path.

7. The system of claim 6, wherein the camera controller is configured to receive signals from the actuator indicating when the barcode-reading device switches between the first part and the second part of the pre-defined path.

8. The system of claim 6, wherein the camera controller is configured to predict when the actuator is going to cause the barcode-reading device to switch between the first part and the second part of the pre-defined path based on pre-defined timing.

9. The system of claim 6, wherein the camera controller is configured to cause the first camera to capture images both when the barcode-reading device moves along the first part of the pre-defined path and also when the barcode-reading device moves along the second part of the pre-defined path.

10. The system of claim 6, wherein at least part of the conveyor belt is located within the field of view of the first camera at all times while the barcode-reading device moves along the pre-defined path.

11. The system of claim 6, wherein the conveyor belt is not always located within the field of view of the first camera while the barcode-reading device moves along the pre-defined path.

12. The system of claim 6, wherein:
the actuator receives signals from a conveyor belt controller;
the signals indicate the conveyor belt speed; and
the actuator sets the speed of the barcode-reading device based on the signals.

13. The system of claim 6, wherein:
the barcode-reading device is coupled to a track that runs parallel to the length of the conveyor belt; and
the actuator causes the barcode-reading device to move back and forth between a back end of the conveyor belt and a front end of the conveyor belt.

14. The system of claim 13, wherein:
during the first part of the pre-defined path, the actuator causes the barcode-reading device to move in a forward direction along the track from the back end of the conveyor belt toward the front end of the conveyor belt; and
during a second part of the pre-defined path, the actuator causes the barcode-reading device to move in a backward direction along the track from the front end of the conveyor belt toward the back end of the conveyor belt.

15. The system of claim 6, wherein:
the actuator is coupled to a motor;
the motor is coupled to a shaft;
the motor causes the shaft to swing as a pendulum parallel to the length of the conveyor belt; and
the barcode-reading device is coupled to the shaft.

16. The system of claim 15, wherein:
during the first part of the pre-defined path, the actuator causes the barcode-reading device to swing from the back end of the conveyor belt toward the front end of the conveyor belt; and
during a second part of the pre-defined path, the actuator causes the barcode-reading device to swing from the front end of the conveyor belt toward the back end of the conveyor belt.

17. The system of claim 6, wherein:
the barcode-reading device is coupled to a rotatable shaft; and
the actuator causes the shaft to rotate.

18. The system of claim 1, wherein:
the system further comprises a second camera; and
the actuator causes the second camera to move along the second part of the pre-defined path while the first camera moves along the first part of the pre-defined path.

* * * * *